United States Patent
Ginter et al.

(10) Patent No.: US 6,868,564 B2
(45) Date of Patent: Mar. 22, 2005

(54) SANITARY FITTING, PARTICULARLY KITCHEN MIXER

(75) Inventors: Gerhard Ginter, Tennenbronn (DE); Alessio Orlandi, Barbengo (CH); Patrik Riester, Kirnbach (DE)

(73) Assignee: Hansgrohe AG, Schiltach (DE)

( * ) Notice: Subject to any disclaimer, the term of this patent is extended or adjusted under 35 U.S.C. 154(b) by 0 days.

(21) Appl. No.: 10/220,903

(22) PCT Filed: Feb. 14, 2001

(86) PCT No.: PCT/EP01/01612

§ 371 (c)(1),
(2), (4) Date: Jan. 7, 2003

(87) PCT Pub. No.: WO01/66987

PCT Pub. Date: Sep. 13, 2001

(65) Prior Publication Data

US 2003/0140413 A1 Jul. 31, 2003

(30) Foreign Application Priority Data

Mar. 9, 2000 (DE) .......................................... 100 11 505
Aug. 5, 2000 (EP) ............................................ 00116927

(51) Int. Cl.⁷ ............................................... E03C 1/04
(52) U.S. Cl. ................................... 4/677; 4/676; 4/675
(58) Field of Search ........................... 4/677, 676, 675, 4/678; 137/801, 606, 615; 285/321

(56) References Cited

U.S. PATENT DOCUMENTS

| | | | |
|---|---|---|---|
| 3,080,570 A | * | 3/1963 | Weddendorf, Jr. ............. 4/677 |
| 4,103,709 A | | 8/1978 | Fischer |
| 5,685,341 A | | 11/1997 | Chrysler et al. |
| 6,079,447 A | * | 6/2000 | Holzheimer et al. ........ 137/801 |
| 6,457,191 B2 | * | 10/2002 | Brandebusemeyer et al. .. 4/678 |

FOREIGN PATENT DOCUMENTS

| | | |
|---|---|---|
| DE | 3726436 | 2/1988 |
| DE | 8908214 | 10/1989 |
| DE | 4002852 | 8/1991 |
| EP | 2150836 | 12/2000 |

* cited by examiner

Primary Examiner—Henry Bennett
Assistant Examiner—Amanda Flynn
(74) Attorney, Agent, or Firm—Duane Morris, LLP

(57) ABSTRACT

A sanitary appliance for use, for example, as a kitchen water control and temperature mixing valve, has a base part which is fixed to a plate and a housing surrounding the base part. The base part receives all functional parts of the appliance but is not visible from the outside. A receiving area for a mixer cartridge is provided in the base part, in addition to a bottom for feed pipes and optionally drainpipes. The mixer cartridge and the feed pipes are connected by a mechanism of an interchangeable intermediate element. The appliance can be adapted to various operational modes and mixer cartridges by replacing the intermediate element.

21 Claims, 5 Drawing Sheets

Change "36" to --3b--

SANITARY FITTING, PARTICULARLY KITCHEN MIXER

BACKGROUND OF THE INVENTION

1. Field of the Invention

The invention relates to a sanitary fitting, such as a kitchen type water flow and temperature mixing control valve, having a fitting body mounted at an opening in a countertop or plate.

2. Prior Art

Sanitary fittings normally comprise a fitting body, which is e.g. made from cast brass. Fittings have also been proposed in which the fitting body is constructed as a sheet metal part or from plastic. In conventional sanitary fittings, the outside of this fitting body simultaneously forms the outer shape of the sanitary fitting.

A single hole-single lever mixing fitting is known (DE-C2-3243750), in which a cast metal battery housing has an externally, substantially cylindrically constructed area into which issue connecting passages. This area is covered by a ring, in which a check valve is provided and which leads to a separate appliance connecting pipe.

A single hole mixing fitting is also known (DE-A1-3022706), which has a pedestal with an insertion connecting piece for fixing in a wash basin. Bowden wires can pass through the pedestal, to which is connected the remainder of the fitting housing.

It would be to provide a sanitary fitting, of a improved type, which in the case of a simple construction can be adapted to different functions and uses.

SUMMARY OF THE INVENTION

To solve this problem the invention proposes a sanitary fitting having the features disclosed herein and defined in the independent claim(s) Further developments of the invention form the subject matter of the dependent claims, whose wording, like that of the abstract, is by reference made into part of the content of the present description.

The base part, together with the intermediate element, can be constructed in such a way that it can receive the mixing device, e.g. a mixer cartridge. The base part is constructed in such a way that it can be fitted with a fastening or fixing device to the plate-like element, e.g. a counter top or other a rinsing surface. To the base part is then connected the housing, which completely surrounds the base part. The external shape and the surface characteristics are consequently only determined by the housing, which does not take over any supporting functions. The liquid connection between the water-carrying parts, i.e. the supply pipes and optionally a pipe passing on further, the outlet from the sanitary fitting and the mixer valve, is at least partly taken over by the intermediate element. To adapt to different tasks and functions of the sanitary fitting, it is only necessary to remove the intermediate element and replace it by another intermediate element. Thus, the most varied of fittings can be housed in the base part. Through the replacement of the housing, there can also be an adaptation to different shapes and colors.

According to a further development of the invention the base part can have a bottom for the connection of water supply pipes and optionally a pipe passing on further. This bottom can in particular be inserted in the base part and for this purpose a mounting support can be provided, e.g. a single shoulder, on which the bottom rests.

According to a further development of the invention the intermediate element, which is inserted in the base part, can have or form a bottom for the mixing device, e.g. a mixer cartridge. For the axial orientation of the intermediate element the base part can be internally provided with a shoulder, on which the intermediate element rests.

The housing, completely surrounding the base part, can optionally be fixed to the plate-like element, to which the base part is fitted. However, it is particularly favorable and is provided in a further development, for it to be fitted and optionally also fixed to the base part.

According to a further development of the invention the housing and/or the base part has a sleeve-like construction.

According to the invention the housing can be sealed relative to the base part.

According to another further development of the invention a sealed space between the casing and the base part is constructed as a water duct and consequently participates in the sanitary fitting function.

For example, the space between the housing and the base part can be used for implementing a connection to an outflow, which is in particular provided on or formed by the housing.

According to a further development of the invention the housing can be fixed in rotary manner to the base part and as a result it is e.g. possible to pivot the outflow.

The invention more particularly proposes the provision in the aforementioned receptacle of a mixer cartridge, which can be a standardized mixer cartridge. For the fixing of the mixer cartridge can be provided a box nut, which is e.g. screwed onto the base part and which not only secures, but also axially braces the mixer cartridge. The bracing of the mixer cartridge can be utilized for also bracing the bottom for fixing water pipes and/or the intermediate element and therefore for axially securing the same in the base part.

According to a further development of the invention a box nut is provided, which axially secures the housing on the base part, but which optionally still allows turning.

It can in particular be provided that the box nut for bracing the mixer cartridge is simultaneously used for axially securing the housing on the base part.

According to the invention, for fixing the sanitary fitting the latter can have a tubular element with an external thread inserted in and connected to the base part. The tubular element is advantageously connected to the base part in such a way that around it is formed a support shoulder located in one plane. The tubular element is passed through a corresponding opening of the plate-like element and is braced with the latter from the other side.

The fixing device can be constituted by a stay bolt inserted in the base part.

According to a further development of the invention it is possible to screw a collar, which additionally axially secures the housing on the base part, and can be located on the box nut securing the mixer cartridge.

According to another further development of the invention the base part is constructed in two portions, particularly arranged in an axial, reciprocal extension. This makes it possible to implement different functions, sizes or other changes and one of the two portions may optionally only assume an optical function. It is e.g. possible to produce higher fittings.

It is in particular possible for the two portions to be interchangeably retained on one another.

According to a further development of the invention one of the two portions of the base part has the mixer cartridge, e.g. in the above-described receptacle, whereas the other portion is a socket or pedestal part. The latter is mainly used for forming the bearing face on the surface to which fixing takes place. In particular, the pedestal part has the fixing device for the sanitary fitting. The connection between the fixing device, the pedestal part and the second part of the base housing can be constructed in such a way that the pedestal part can be omitted, so that the fixing device can be connected in the same way to the pedestal part or to the second portion of the base part.

In a further development the pedestal part can have additional functional parts of the sanitary fitting, e.g. operating devices, sensors for proximity electronics, Bowden wires for the plug lifter of the relief valve, etc.

However, it is in particular possible to provide for one of the two portions of the base part and in particular the pedestal part, to have a valve for shutting off or changing the position for a separate outlet. Said outlet can optionally pass to the outside through the pedestal part. However, it is particularly favorable if the connection to the outlet leads through the fitting onto the underside of the fixing face. Said valve can also be an appliance valve for a washing or rinsing machine.

The valve can provide a connection to water supply pipes upstream of the mixing devices of the sanitary fitting, e.g to the hot or cold water supply pipe. Optionally this can also take place in alternating manner.

It is also possible for the additional valve to provide a connection to the mixed water pipe of the sanitary fitting and for it to be located downstream of the mixer cartridge.

It is also possible for the pedestal part to have a connection for a month douche.

BRIEF DESCRIPTION OF THE DRAWINGS

Features, details and advantages of the invention can be gathered from the following description of a preferred embodiment with reference to the attached drawings, wherein show.

DETAILED DESCRIPTION

The drawings diagrammatically illustrate the fitting of a sanitary fitting to a plate-like element and in the left-hand half of all the drawings is shown a relatively thick plate 1, whereas a thin plate 2 is shown in the right-hand half. The type of bracing is similar for both plate types.

Figure 1:
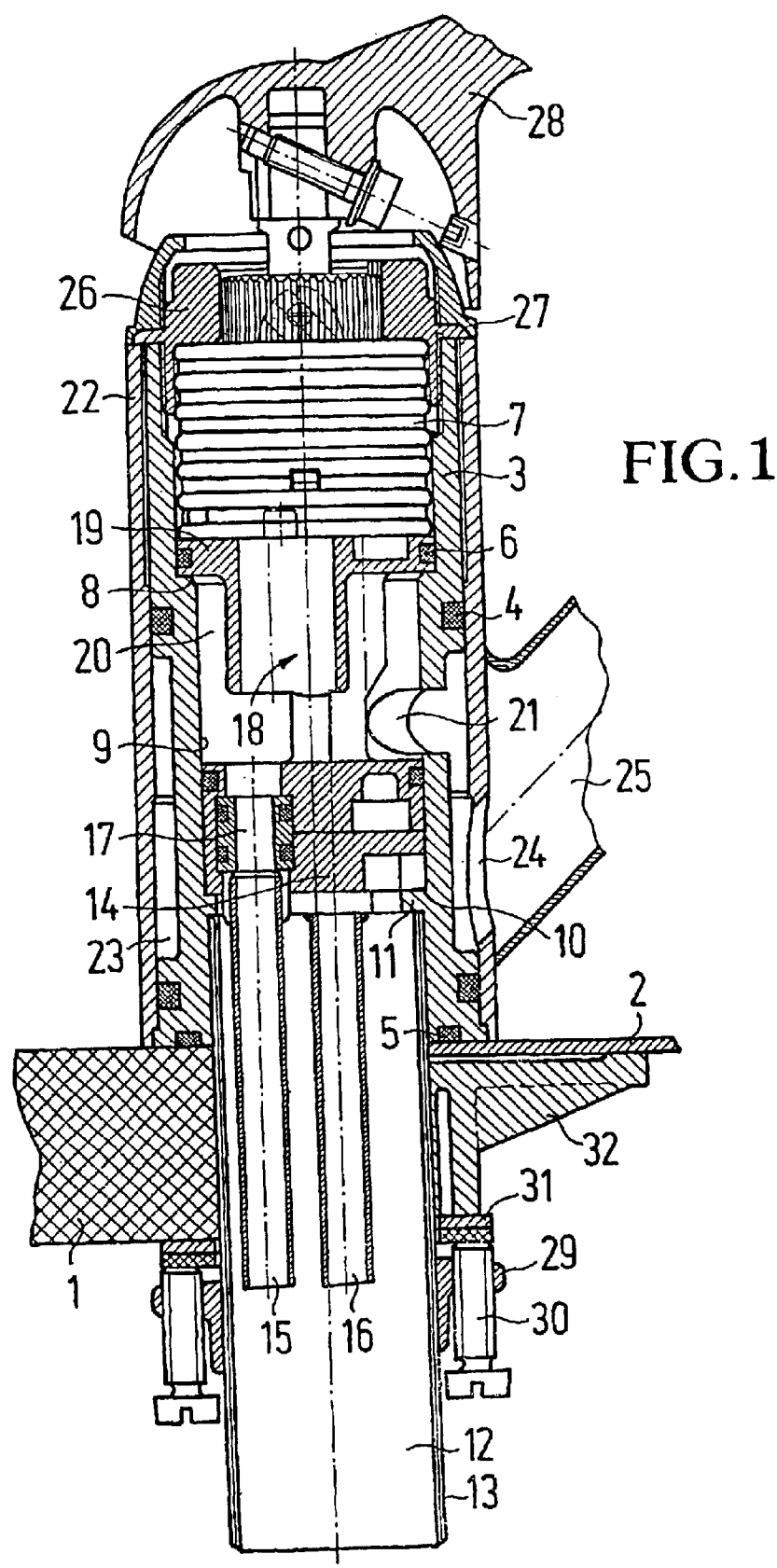
FIG. 1 An axial section through a sanitary fitting according to a first embodiment of the invention.

The sanitary fitting of FIG. 1 contains a sleeve-like base part 3. On starting from the top in FIG. 1, it contains an externally circular cylindrical area emanating from a planar front end, to which is connected a second, externally circular cylindrical area with a reduced diameter. At the lower end the diameter present at the upper end is again assumed. The reduced diameter area is sealed from the remaining end regions by a circumferential seal 4. The lower front face of the base part 1, which also has a circumferential seal 5, has a planar construction and forms a bearing face with which the base part 3 rests on the top of the plate 1 or 2.

Once again starting from the top, the base part 3 has on the inside a circular cylindrical receptacle 6 for a mixer cartridge 7 shown in simplified form. The receptacle 6 is bounded by a shoulder 8, which is formed in that at this point the internal diameter of the base part 3 is reduced. To the shoulder 8 is connected a cylindrical inner space 9, which is bounded by a circumferential ring shoulder 10. The ring shoulder 10 is formed by an inwardly projecting rib 11. Below the rib 11 a tubular element 12 is inserted in to the base part 3 and is e.g. screwed, welded or soldered to the base part 3. The tubular element projects well above the lower bearing face of the base part 3. The tubular element 12 has an external thread 13.

On the ring shoulder 10 is placed a bottom 14, which has connecting nipples for the supply pipes 15, 16. Each of the ends of the supply pipes 15, 16 is inserted in a nipple 17, which is constructed as a cylindrical sleeve and has on its outside two grooves for receiving in each case one seal. The nipple 17 is seated in a stepped hole of the bottom 14 in such a way that one of the two seals seals it with respect to the bottom 14. The nipple 17 projects so far over the top of the bottom 14 that the other seal engages in a stepped hole of an intermediate element 18 located above the same and seals it with respect to said intermediate element.

On the bottom 14 in the base part 3 is inserted from above the intermediate element 18, which has in the vicinity of its lower end the aforementioned component cooperating with the connecting nipple 17 of the supply pipes 15, 16. It is not readily apparent from FIG. 1 how this intermediate element 18 is constructed. However, it is clear that said intermediate element fits into the region of the base part 3 with the reduced internal diameter and that its axial position is determined by the fact that a bottom 19 located at its upper end rests on the shoulder 8. However, without resting on the shoulder, the intermediate element can be pressed by the cartridge onto the bottom 14 and can consequently fix the same. The component 18 contains a few connecting channels, in order to produce the connection between the supply pipes 15, 16 and the mixer cartridge 7. The bottom 19 located at the upper end of the intermediate element 18 and which is sealed from the inside of the component 3, forms the bottom for the mixer cartridge 7.

Between the intermediate element 18 and the inside of the base part 3 is provided an intermediate space 20, which can be entered by water e.g. leaving the mixer cartridge 7. An opening 21 in the base part 3 leads outwards from the space 20.

On the cylindrical outside of the base part 3 is engaged from above a housing 22, which optionally with a small or also large spacing surrounds the outside of the base part 3. The housing can be sealed with respect to the base part 3 by seals 4. By reducing the external diameter of the base part 3 in the area between the two circumferential seals, a space 23 is formed there between the base part 3 and the housing 22 into which water passes through the opening 21. Thus, in the embodiment shown, said space is constructed as a water passage.

The housing 22 has in an area, which corresponds to said sealed space, an opening 24 which leads into an outflow spout 25 which, only partly shown in the drawing, leads to an outflow. By rotating the housing 22 with respect to the base part 3, the outflow 25 can be rotated about the rotation axis of the base part 3.

For securing the mixer cartridge 7 in the receptacle 6 of the base part 3 is provided a box nut 26, which is screwed into a thread of the end region of receptacle 6. The box nut 26 has an outer flange 27, which radially projects over the outside of the base part 3. On bracing the mixer cartridge 7 in the base part 3, the intermediate element 18 is also braced against the shoulder 8 or bottom 14. As a result of the radial projection of the outer flange 27, there is also an axial securing of the housing 22 on the base part 3. However, this axial securing is not a bracing action, because in the embodiment shown the housing 22 can be rotated relative to the base part 3. However, versions do exist, e.g. for wash basins, in which the housing does not rotate relative to the base part.

In the vicinity of the underside of the base part 3 the housing 22 rests on a shoulder of said base part 3, so that its underside is roughly flush with the bearing face of part 3. In the case of a rotatable housing there must be a gap between the surface of the component to which the fitting is fixed and the said housing. This prevents a scraping of the housing on the surface.

In order to operate the mixer cartridge an operating element 28, which is not further illustrated, is provided. The mixer cartridge can have a thermostatic or mechanical temperature control.

For fixing the fitting to the plate 1 or 2 a nut 29 is screwed onto the outer thread 13 of the tubular element 12 and said nut has several axially directed tapped holes. Into each of the tapped holes is screwed a screw 30. Between the screws 30 and the underside of the plate 1 or 2 are placed two flat rings 31, which are intended to distribute the pressure exerted by the screws 30. By tightening the screws 30 the fitting is braced with the plate 1 or 2. With respect to the right-hand side of the drawings in connection with the fixing an intermediate element 32 is inserted between the rings 31 and the plate 2 and this forms a larger working surface for the thinner plate.

Figure 2:
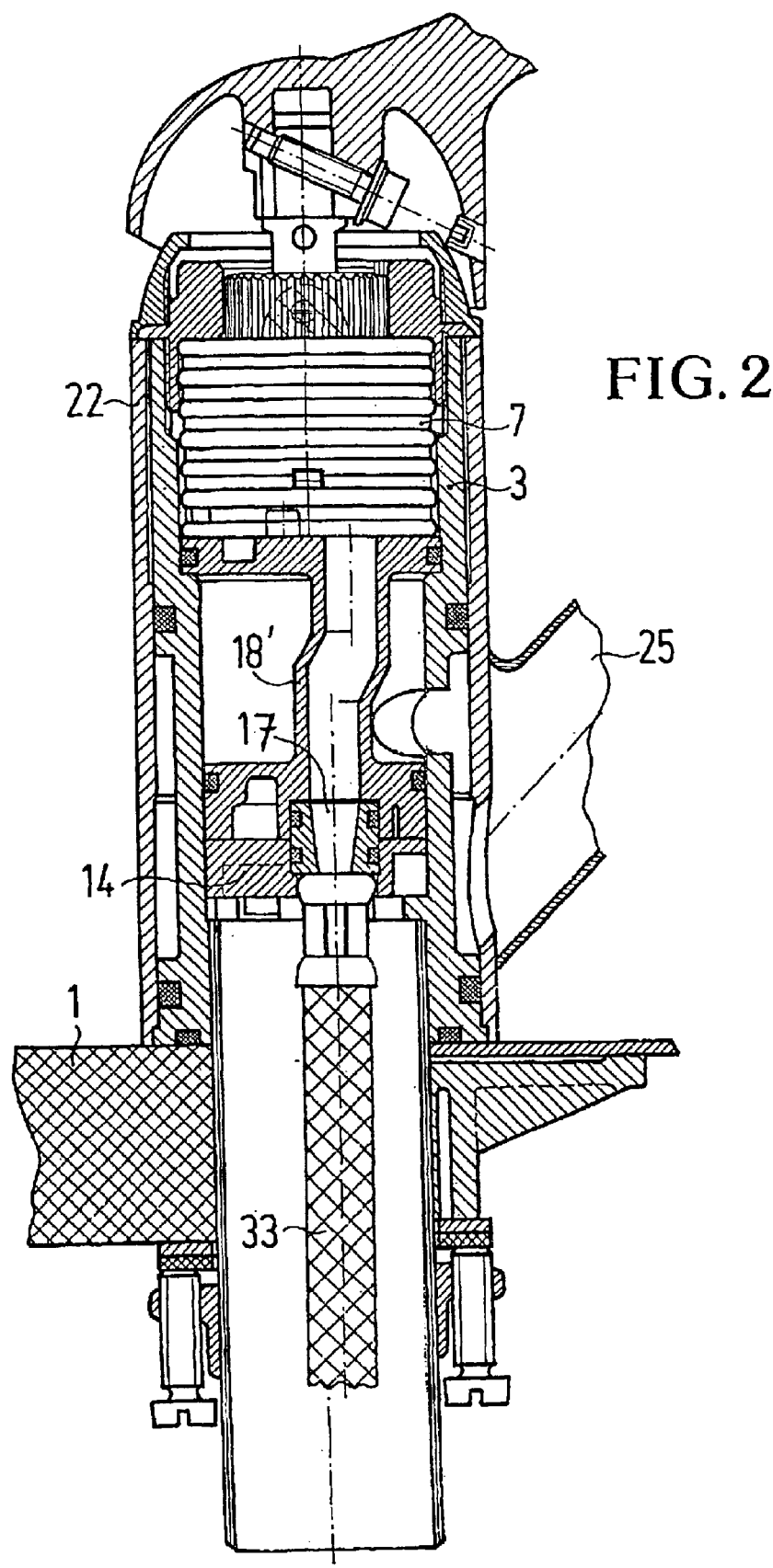
FIG. 2 An axial section through a sanitary fitting according to a second embodiment.

The embodiment according to FIG. 2 differs from that according to FIG. 1 in that in place of a rigid supply pipe a supply hose 33 is used, which is connected in similar manner with the aid of a nipple 17 to the bottom and the intermediate element 18'. A different intermediate element 18' is used. The remaining parts of the fitting are the same or similar, so that they will not be described again.

A comparison of FIGS. 1 and 2 reveals that the base part 3 and housing 22 are identical in both embodiments and the bottom 14 can also be identical. The nature of the fixing to the plate 1 or 2 is also identical. The only part which differs in connection with the two fittings is the intermediate element 18 and optionally the bottom 14.

Figure 3:
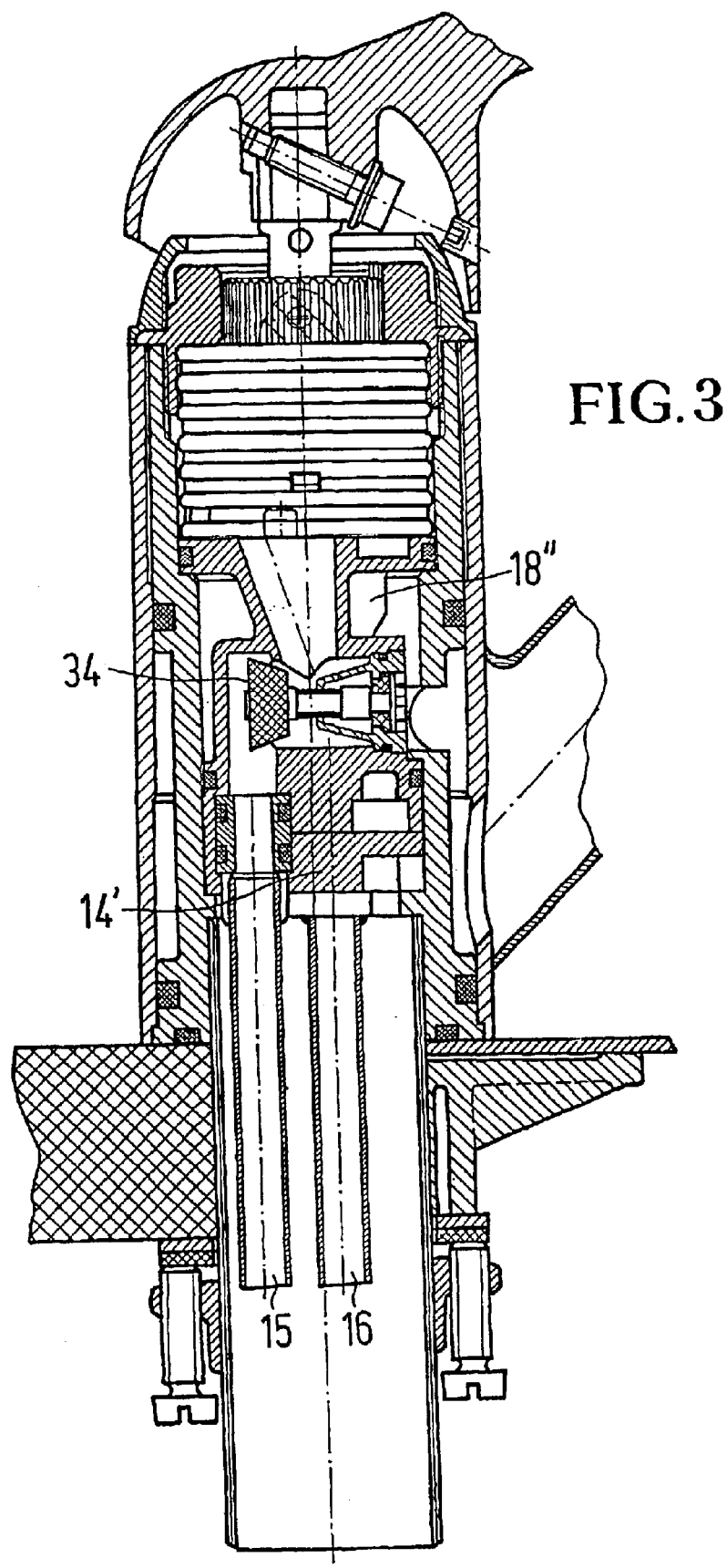
FIG. 3 An axial section through a sanitary fitting according to a third embodiment.

In the embodiment of FIG. 3 a third intermediate element 18" is used, which in this case contains a valve 34 for a hose sprinkler or shower. The construction of the valve 34 is such that it is automatically reset in the case of a pressure drop. It is clear that it is only necessary to replace the intermediate element 18 and optionally the bottom 14 for the supply pipes 15, 16 in order to bring about a different behavior or obtain a different sanitary fitting.

The bottom 14 could also be constructed in one piece (integrally) with the base part. In the case of a loose bottom it can optionally be connected to the intermediate part by locking connections and can be fitted together with the connecting pipes as a subassembly. It would also be possible to connect in the same way the mixer cartridge with the intermediate part.

It is clear from what has been stated hereinbefore that the sanitary fitting according to the invention can be converted by the replacement of a few parts into a sanitary fitting with a different behavior or with different connection possibilities. By replacing the housing 22 it is also possible to achieve a different fitting appearance, e.g. a different housing shape or color.

Figure 4:
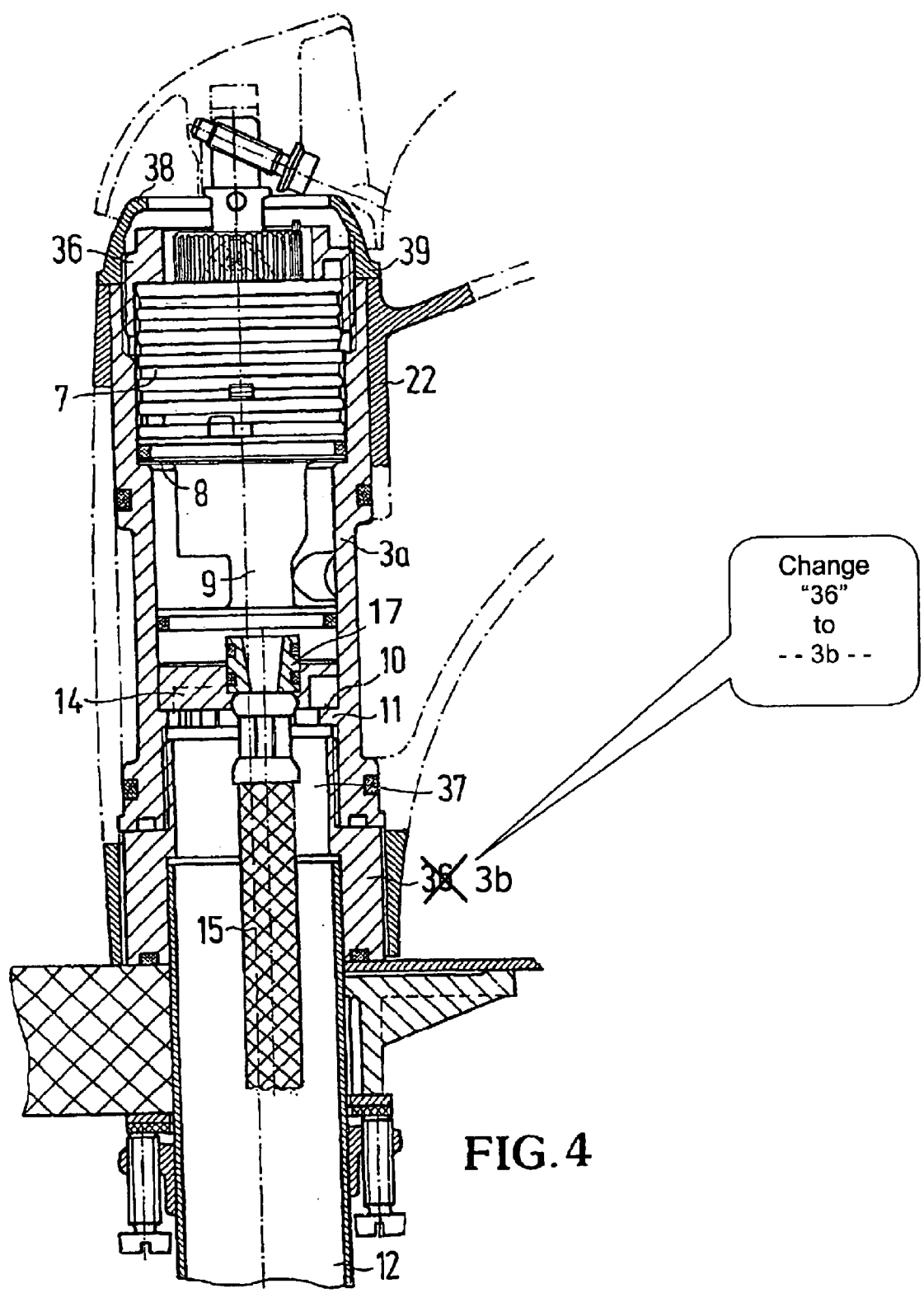
FIG. 4 An axial section through a fourth embodiment of the invention.

FIG. 4 shows another embodiment of the sanitary fitting proposed by the invention. The base part 3 is in this case formed by two portions 3a, 3b arranged in an axial extension. The portion 3a contains the receptacle for the mixer cartridge 7 and the intermediate bottom 14, in which are located the nipples for the supply hoses 15. The base part still comprises a pedestal portion 3b, which rests on the surface of the fixing plate. The pedestal portion 3b contains a bore with an internal thread into which is screwed the fixing pipe 12. In an extension of the bore receiving the fixing pipe 12 the pedestal portion 3b contains a lug 37 with an external thread corresponding to the external thread of the fixing pipe 12. With said lug 37 the pedestal portion 3b is screwed into the portion 3a of the base part. This means that the pedestal portion 3b could also be omitted, because the fixing pipe 12 could also be directly screwed into the base part 3.

The upper portion 3a is located on a shoulder of the pedestal portion 3b. The outside of the pedestal portion 3b is approximately aligned with the outside of portion 3a. As indicated in the drawing, the housing 22 is constructed in such a way that it surrounds on all sides both the portion 3a and the pedestal portion 3b of the base part 3.

It would also be conceivable to provide the pedestal portion 3b with a larger external diameter and to allow the housing 22 only to extend up to the shoulder of the pedestal portion 3b.

In the embodiment shown the pedestal portion 3b merely extends the fitting, which can e.g. be desirable for optical or design reasons. It is also possible and is proposed by the invention that the pedestal portion 3b takes over further functions, e.g. receives an additional device. It would e.g. be possible to house an appliance valve for a washing or rinsing machine or also an operating device for the plug lifter of the drain valve in the said pedestal portion 3b. It would also be possible for it to house sensors for a proximity electronics or other miscellaneous sensors.

The box nut 36 is constructed in such a way that it only secures the mixer cartridge 7 in the base part 3a. The box nut 36 has an external thread which is still accessible after the securing of the cartridge. Onto said external thread is screwed a collar 38, whose edge 39 projects radially over the base part 3 and consequently secures the housing 22 against an upward raising.

Figure 5:
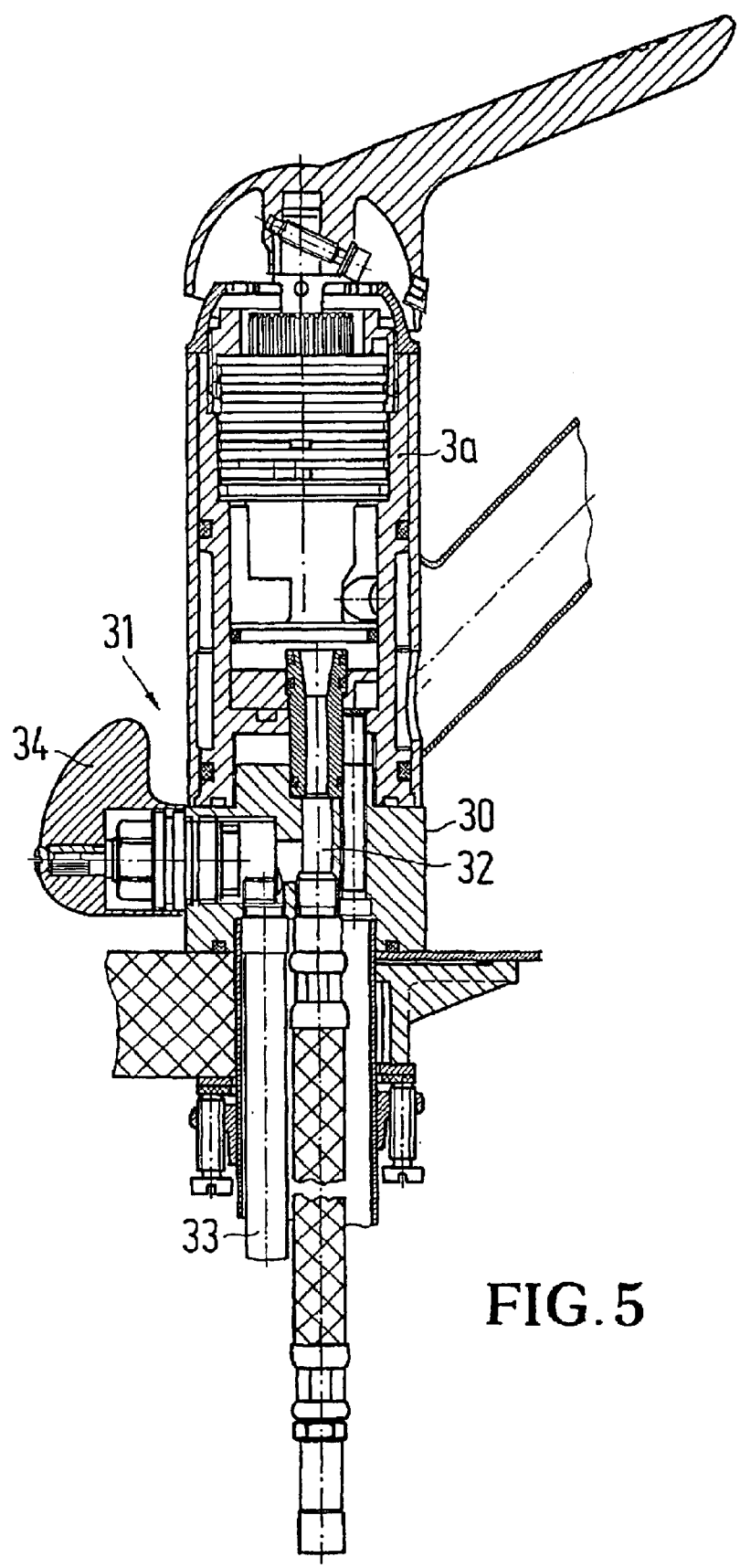
FIG. 5 An axial section through a fitting with an additional valve.

In the embodiment of FIG. 5, the construction of said sanitary fitting is similar to that shown in FIG. 4, so that only the differences will be explained.

Once again the base part is constructed from two portions arranged in a mutual axial extension, whereof the pedestal portion 30 now has a different interior. However, its external dimensions are similar to those of the embodiment of FIG. 4, i.e. it can be screwed into the identical second portion 3a of part 3. The fixing of the plate with the aid of a threaded sleeve takes place in the same way as in the preceding embodiments.

The pedestal 30 contains a check valve 31, which makes it possible to produce a connection between the cold water supply pipe, which leads into a duct 32, and an additional outlet 33. This additional outlet 33, which is a copper pipe in the embodiment shown, leads through the fixing opening and the fitting to the lower side of the wash basin plate to which fixing has taken place. On the back of the pedestal 30 remote from the outflow spout is provided an operating handle 34 for the check valve 31. It is in fact a clamp handle, which can be turned about an axis running perpendicular to the longitudinal axis of the fitting. The check valve 31 is used e.g. for supplying water to a rinsing machine. It can optionally also be constructed as a check and changeover valve, so that the user can choose whether he wishes to supply his rinsing or washing machine initially with hot water or with cold water.

It is also conceivable to construct the valve in such a way that it is supplied with mixed water downstream of the mixer cartridge. Several valves could be optionally provided in place of the single check valve 31.

In the pedestal part can be provided an additional connection, which leads roughly radially out of said part. It is here possible to e.g. connect a mouth douche.

We claim:

1. A sanitary fitting, comprising:
   a base part including a receptacle for a mixer device and a fixing device for fixing the base part to a plate-like element;
   an intermediate element that is insertable in the base part and makes at least one of a hydraulic and mechanical connection between water-carrying parts of the sanitary fitting;
   a housing that completely surrounds the base part;
   wherein the base part is constructed from two portions arranged in axial extension and one of the two portions is held in interchangeable manner on the other of the two portions, wherein the base part has a sleeve-like construction and the fixing device comprises a tubular element with an external thread, inserted into and connected to the base part.

2. The sanitary fitting according to claim 1, wherein a bottom in the base part provides connections at least for water supply pipes.

3. The sanitary fitting according to claim 2, wherein the bottom rests on a shoulder.

4. The sanitary fitting according to claim 1, wherein the intermediate element provides a bottom for a mixer cartridge.

5. The sanitary fitting according to claim 1, wherein the intermediate element rests on a shoulder.

6. The sanitary fitting according to claim 1, wherein the housing is secured on the base part.

7. The sanitary fitting according to claim 1, wherein the housing is sealed relative to the base part.

8. The sanitary fitting according to claim 1, wherein a sealed space is constructed in water-carrying manner between the housing and the base part.

9. The sanitary fitting according to claim 1, wherein the housing integrally provides an outflow.

10. The sanitary fitting according to claim 1, wherein the housing is fixed in rotary manner to the base part.

11. The sanitary fitting according to claim 1, further comprising a mixer cartridge inserted in the reception.

12. The sanitary fitting according to claim 11, further comprising a box nut (26) for axially securing the mixer cartridge in the base part.

13. The sanitary fitting according to claim 1, further comprising a box nut for axially securing the housing on the base part.

14. The sanitary fitting according to claim 13, wherein the box nut axially secures both the mixer cartridge and the housing.

15. The sanitary fitting according to claim 1, wherein the fixing device has stay bolt inserted in the base part.

16. The sanitary fitting according to claim 1, wherein the base part has a bearing shoulder for bearing on a plate-like element to which the sanitary fitting can be mounted.

17. The sanitary fitting according to claim 1, wherein the fixing device is integral with the base part.

18. The sanitary fitting according to claim 13, with a collar, which can be screwed onto the box nut and secures the housing on the base part.

19. The sanitary fitting according to claim 1, wherein one of the two portions of the base part has the receptacle for the mixer cartridge, whereas the other portion is a pedestal portion.

20. The sanitary fitting according to claim 19, wherein the pedestal portion has the sanitary fitting fixing device.

21. The sanitary fitting according to claim 1, wherein the housing surrounds both portions of the base part.

* * * * *